C. M. CROSSNO.
EVAPORATING PAN.
APPLICATION FILED JULY 8, 1918.
1,311,049.
Patented July 22, 1919.
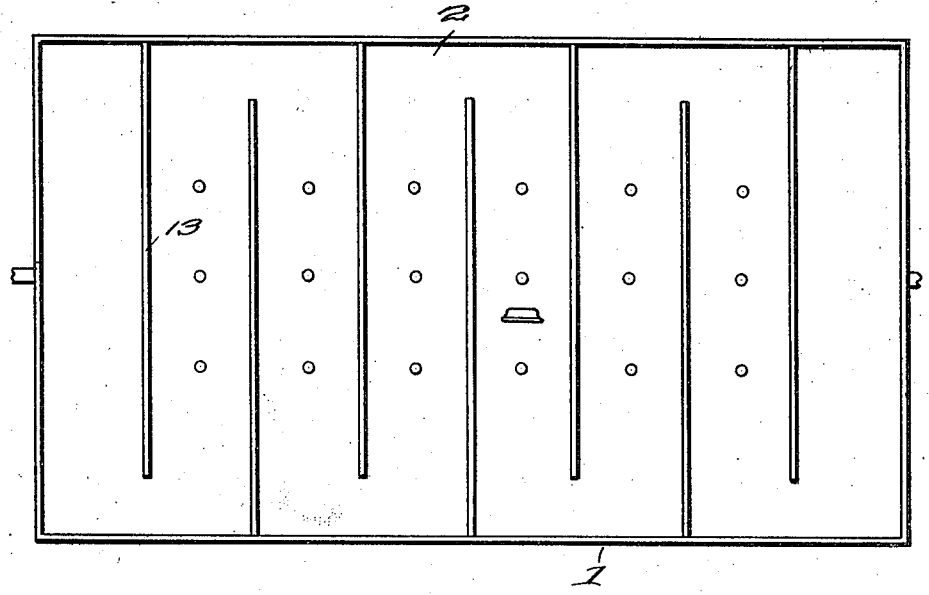
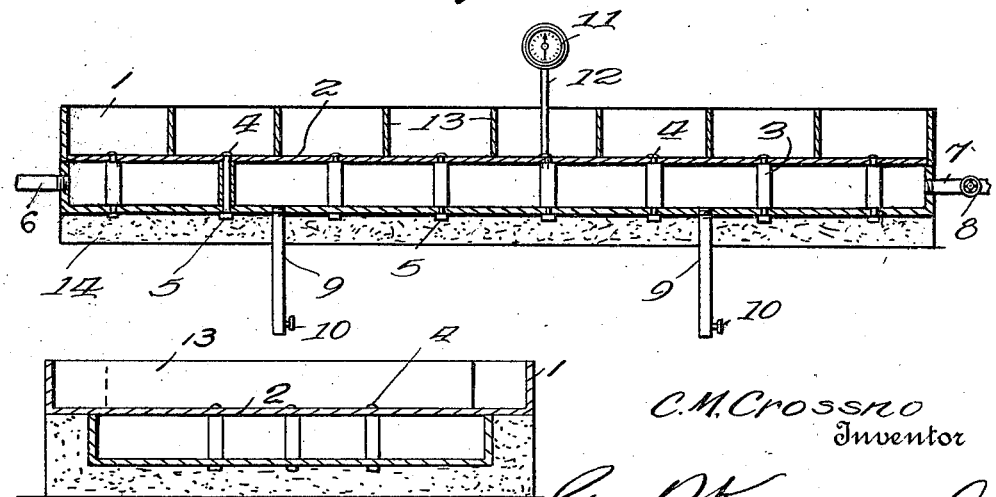

UNITED STATES PATENT OFFICE.

CHARLES M. CROSSNO, OF SALLISAW, OKLAHOMA.

EVAPORATING-PAN.

1,311,049. Specification of Letters Patent. Patented July 22, 1919.

Application filed July 8, 1918. Serial No. 243,929.

*To all whom it may concern:*

Be it known that I, CHARLES M. CROSSNO, a citizen of the United States, residing at Sallisaw, in the county of Sequoyah and State of Oklahoma, have invented certain new and useful Improvements in Evaporating-Pans, of which the following is a specification.

This invention relates to devices adapted for use in the manufacture of molasses from the juice of sorghum and it is the principal object of the invention to provide an improved evaporating pan whereby the juice can be reduced to the proper consistency without liability of scorching or wasting the same.

It is a more specific object of the invention to provide an evaporating pan having a steam receiving and circulating compartment arranged adjacent the bottom of the same, whereby heat will be uniformly transmitted to the sorghum or other syrup juices for gradually evaporating the same.

Among other aims and objects of the invention may be cited, the provision of a pan of the character mentioned with a view to compactness, and in which the number of parts are few, the construction simple, the cost of production small, and efficiency and operation high.

The improvements in the details and arrangement of parts will be apparent from an inspection of the accompanying drawings, in connection with the specific description hereinafter contained, and wherein the preferred embodiment of the invention is disclosed for the purpose of imparting a full understanding of the same.

In the drawings:—

Figure 1 is a top plan of my improved pan,

Fig. 2 is a vertical longitudinal section through the same, and

Fig. 3 is a transverse section through the pan.

Similar reference characters refer to similar parts throughout the several views of the drawings.

Having more particular reference to the drawings, 1 represents the pan, the said pan being provided with a false bottom 2 supported upon a plurality of tubular elements 3 having bolts 4 passing therethrough, the heads of the bolts being engaged with the false bottom 2 while the lower extremities thereof pass through suitable openings formed in the bottom of the pan and are engaged by the usual locking nuts 5. In this connection, gaskets or other form of packing means, not shown may be arranged adjacent the heads of the bolts and the nuts 5.

Steam inlet and outlet pipes 6 and 7 communicate with the lower portions of the end walls of the pan 1, the pipe 7 having a safety valve 8 arranged therein to control the exhaust of steam from the steam receiving and circulating chamber formed by the arrangement of the false bottom 2. Other pipes 9 are tapped into the bottom of the pan or the steam receiving and circulating chamber and have valves 10 arranged therein, whereby the water of condensation from the steam circulated through the steam receiving and circulating chamber may be drained therefrom as it becomes necessary.

A pressure gage 11 may be and preferably is provided and communicates with the steam receiving and circulating chamber by way of a conduit 12. Thus, the pressure of the steam in the said chamber may at all times be accurately determined by an operator.

Baffles generally indicated by the numeral 13 are alternately engaged with the opposite side walls of the pan and rest upon the false bottom 2, thus, providing a tortuous port or path for the sorghum juice being evaporated in the pan.

In using my improved evaporating pan it will be readily understood by those skilled in the art that all liability of scorching or wasting the sorghum juice during the evaporating process is eliminted and due to the transmission of an even and uniform heat to the juice, the same will be reduced to the desired consistency in an effective and rapid manner. Liability of explosions due to excessive pressure of steam in the steam receiving and circulating chamber of the pan are eliminated by use of the safety valve 8 which is connected to the outlet pipe 7.

In order to prevent waste of heat and also to prevent the steam from being condensed any more than necessary there has been provided a jacket 14 which will be formed of asbestos and will extend about the bottom and lower side portions of the pan. It will thus be seen that the pan will be thoroughly heated as the heat will be retained in the lower portion thereof by the asbestos jacket. It will be further noted that instead of providing a false bottom 2 supported in the pan by the sleeves 3 the bottom 2 may be formed integral with the side walls of the evaporating pan and a false bottom or heating chamber positioned beneath this evaporating pan as shown in Fig. 3 and held in place by the bolts 4 passing through the sleeves 3, the asbestos jacket being positioned about this false bottom or heating chamber as shown.

I claim:—

A device of the character described comprising a pan having an upper chamber and a lower chamber, the upper chamber having a bottom and side walls and the lower chamber having a bottom and side walls, sleeves in the lower chamber extending between the bottom of the chambers, bolts extending through the sleeves and through the bottoms of the chambers, steam inlet and outlet pipes communicating with the lower chamber, a drain pipe communicating with the lower chamber, and an asbestos jacket positioned about the bottom and side walls of the lower chamber.

In testimony whereof, I affix my signature hereto.

CHARLES M. CROSSNO.

Copies of this patent may be obtained for five cents each, by addressing the "Commissioner of Patents, Washington, D. C."